(12) United States Patent
Wang

(10) Patent No.: US 11,831,474 B2
(45) Date of Patent: *Nov. 28, 2023

(54) METHODS AND CIRCUITS FOR DECISION-FEEDBACK EQUALIZATION USING COMPENSATED DECISION REGIONS

(71) Applicant: Cadence Design Systems, Inc., San Jose, CA (US)

(72) Inventor: Nanyan Wang, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,338

(22) Filed: Jul. 5, 2022

(65) Prior Publication Data

US 2022/0407750 A1    Dec. 22, 2022

Related U.S. Application Data

(63) Continuation of application No. 17/059,406, filed as application No. PCT/US2019/037366 on Jun. 14, 2019, now Pat. No. 11,398,932.

(60) Provisional application No. 62/690,665, filed on Jun. 27, 2018.

(51) Int. Cl.
*H04L 25/03* (2006.01)
*H04L 27/34* (2006.01)

(52) U.S. Cl.
CPC ........ *H04L 25/03057* (2013.01); *H04L 27/34* (2013.01)

(58) Field of Classification Search
CPC .......... H04L 25/4917; H04L 25/03184; H04L 25/03305; H04L 25/03019; H04L 25/03057; H04L 27/34
See application file for complete search history.

(56) References Cited

U.S. PATENT DOCUMENTS

| | | |
|---|---|---|
| 8,576,903 B2 | 11/2013 | Raphaeli et al. |
| 8,693,531 B2 | 4/2014 | Warke et al. |
| 8,699,558 B1 | 4/2014 | Wang |
| 8,804,809 B2 | 8/2014 | Raphaeli et al. |
| 8,837,570 B2 | 9/2014 | Shvydun et al. |
| 2013/0322512 A1 | 12/2013 | Francese et al. |
| 2015/0091631 A1 | 4/2015 | Yildirim et al. |

(Continued)

OTHER PUBLICATIONS

EP Response filed on Sep. 21, 2022 in Response to the Extended European Search Report dated Feb. 24 and the Official Communication Pursuant to Rules 70(2) and 70a(2) EPC dated Mar. 15, 2022 for EP Appln. No. 19825717.2. 18 pages.

(Continued)

*Primary Examiner* — Janice N Tieu
(74) *Attorney, Agent, or Firm* — Mark Whittenberger, Esq.; Holland & Knight LLP

(57) ABSTRACT

A decision-feedback equalizer (DFE) samples an input signal with respect to a gamut of p reference-voltage levels to place the symbol represented by the input signal within a voltage region. The DFE derives a set of tentative decisions for the voltage region, the set excluding at least one of the possible values for the symbol under consideration. A feedback stage then selects a final decision from among the tentative decisions.

20 Claims, 8 Drawing Sheets

(56) References Cited

U.S. PATENT DOCUMENTS

2016/0218897 A1* 7/2016 Hossain ............ H04L 25/03019

OTHER PUBLICATIONS

Chen, "Power Optimized ADC-Based Serial Link Receiver", IEEE Journal of Solid-State Circuits, vol. 47, Apr. 2012, 14 pages.

Chung, "ADC-Based Backplane Receivers:Motivations, Issues and Future", Journal of Semiconductor Technology and Science, vol. 16, No. 3, Jun. 2016, 1598-1657, 12 pages.

EP Extended European Search Report dated Feb. 24, 2022 re: EP Appln. No. 19825717.2. 9 pages.

H. Yueksel et al., "A 3.6pJ/b 56Gb/s 4-PAM receiver with 6-Bit TI-SAR ADC and quarter-rate speculative 2-tap DFE in 32 nm CMOS," ESSCIRC Conference 2015—41st European Solid-State Circuits Conference (ESSCIRC), Graz, 2015, pp. 148-151. doi: 10.1109/ESSCIRC.2015.7313850. 4 pages.

Notification of Transmittal of the International Search Report and the Written Opinion of the International Searching Authority, or the Declaration dated Sep. 10, 2019 re: Int'l Appln. No. PCT/US19/037366. 10 Pages.

Pola et al., "A Low-Complexity Decision Feedforward Equalizer Architecture for High-Speed Receivers on Highly Dispersive Channels", Hindawi Publishing Corporation Journal of Electrical and Computer Engineering, vol. 2013, Copyright 2013, 11 pages.

Sarvari et al., "A 5Gb/s Speculative DFE for 2x Blind ADC-based Receivers in 65-nm CMOS", IEEE 2010 Symposium on VLSI Circuits/Technical Digest of Technical Papers, 2010, 2 pages.

Shafik, "Embedded equalization for ADC-based serial I/O receivers", 2011 IEEE 20th Conference on Electrical Performance of Electronic Packaging and Systems, San Jose, CA 2011, pp. 139-142, 4 pages.

* cited by examiner

| Pre-decision LUT $d_n(k)$ | | $d_{n-1}(k)$ | | | |
|---|---|---|---|---|---|
| | | $s_3$ | $s_2$ | $s_1$ | $s_0$ |
| Pre-decision Region | $R_0$ / $TD_0$ | $s_0$ | $s_0$ | $s_0$ | $s_0$ |
| | $R_1$ / $TD_1$ | $s_0$ | $s_0$ | $s_0$ | $s_1$ |
| | $R_2$ / $TD_2$ | $s_0$ | $s_0$ | $s_1$ | $s_1$ |
| | $R_3$ / $TD_3$ | $s_0$ | $s_1$ | $s_1$ | $s_1$ |
| | $R_4$ / $TD_4$ | $s_0$ | $s_1$ | $s_1$ | $s_2$ |
| | $R_5$ / $TD_5$ | $s_1$ | $s_1$ | $s_1$ | $s_2$ |
| | $R_6$ / $TD_6$ | $s_1$ | $s_1$ | $s_2$ | $s_2$ |
| | $R_7$ / $TD_7$ | $s_1$ | $s_2$ | $s_2$ | $s_2$ |
| | $R_8$ / $TD_8$ | $s_1$ | $s_2$ | $s_2$ | $s_3$ |
| | $R_9$ / $TD_9$ | $s_2$ | $s_2$ | $s_2$ | $s_3$ |
| | $R_{10}$ / $TD_{10}$ | $s_2$ | $s_2$ | $s_3$ | $s_3$ |
| | $R_{11}$ / $TD_{11}$ | $s_2$ | $s_3$ | $s_3$ | $s_3$ |
| | $R_{12}$ / $TD_{12}$ | $s_3$ | $s_3$ | $s_3$ | $s_3$ |

FIG. 4

| Pre-decision LUT $d_n(k)$ | | | $d_{n-1}(k)$ | | | |
|---|---|---|---|---|---|---|
| $r_3, r_2, r_1, r_0$ | Voltage Range | Tentative Decision | $s_3$ | $s_2$ | $s_1$ | $s_0$ |
| 0 0 0 0 | $R_0$ | $TD_0$ | $s_0$ | | | |
| 1 0 0 0 | $R_1$ | $TD_1$ | $s_0$ | | | $s_1$ |
| 0 1 0 0 / 1 1 0 0 | $R_2$ | $TD_2$ | $s_0$ | | $s_1$ | |
| 0 0 1 0 | $R_3$ | $TD_3$ | $s_0$ | $s_1$ | | |
| 1 0 1 0 | $R_4$ | $TD_4$ | $s_0$ | $s_1$ | $s_2$ | |
| 0 1 1 0 / 1 1 1 0 | $R_5$ | $TD_5$ | $s_1$ | | $s_2$ | |
| 0 0 0 1 | $R_6$ | $TD_6$ | $s_1$ | $s_2$ | | |
| 1 0 0 1 | $R_7$ | $TD_7$ | $s_1$ | $s_2$ | | |
| 0 1 0 1 / 1 1 0 1 | $R_8$ | $TD_8$ | $s_1$ | $s_2$ | $s_3$ | |
| 0 0 1 1 | $R_9$ | $TD_9$ | $s_2$ | | $s_3$ | |
| 1 0 1 1 | $R_{10}$ | $TD_{10}$ | $s_2$ | $s_3$ | | |
| 0 1 1 1 | $R_{11}$ | $TD_{11}$ | $s_2$ | $s_3$ | | |
| 1 1 1 1 | $R_{12}$ | $TD_{12}$ | $s_3$ | | | |

FIG. 7

METHODS AND CIRCUITS FOR DECISION-FEEDBACK EQUALIZATION USING COMPENSATED DECISION REGIONS

BACKGROUND

Binary communication systems represent information using just two symbols—e.g. relatively high and low voltages—to alternatively represent a logical one and a logical zero (i.e. 1 or 0). The number of levels used to represent digital data is not limited to two, however. For example, a type of signaling referred to as PAM-4 (for 4-level pulse-amplitude modulation) provides for four discrete pulse amplitudes (voltages) to convey two binary bits of data per symbol (i.e., 00, 01, 10, or 11). A series of symbols can thus be communicated as a voltage signal that transitions between levels in a manner that reflects the series. The time each voltage level is held to represent a symbol is termed the "symbol time" and the speed with which symbols can be communicated is termed the "symbol rate." A receiver recovers a set of symbols from a signal by comparing the voltage during each symbol time against one or more reference-voltage levels to distinguish between symbols.

High performance communication channels suffer from many effects that degrade symbols, and consequently render them difficult to resolve. Primary among them are frequency dependent channel loss (dispersion) and reflections from impedance discontinuities. These effects cause neighboring symbols (voltage levels) to interfere with one another and are commonly referred to collectively as Inter-Symbol Interference (ISI). For example, neighboring relatively high-voltage symbols may spread out to raise the level of neighboring lower-voltage symbols; if the resulting voltage distortion is sufficiently high, the lower-voltage symbols may be interpreted incorrectly. Lower-voltage symbols may likewise induce errors in neighboring higher-voltage symbols.

ISI becomes more pronounced at higher signaling rates, ultimately degrading signal quality such that distinctions between originally transmitted symbols may be lost. Some receivers mitigate the effects of ISI using one or more equalizers. One common type of equalizer, the decision-feedback equalizer (DFE), corrects for ISI imposed on a current symbol by a prior symbol by multiplying the value of the prior symbol by a "tap value" calibrated to account for the ISI and adding the resultant product to the voltage level used to interpret the current symbol. ISI from a prior symbol that tends to raise (lower) the level of the current symbol is thus offset by a similar rise (fall) in the reference against which the current symbol is evaluated. The same principle can be extended to multiple preceding symbols.

In high-speed systems it can be difficult to resolve recently received symbols in time to calculate their impact on incoming symbols and apply the requisite feedback. Symbol pre-decision is used in some DFEs to ease this timing constraint. Each received symbol is ISI-compensated based on hypothetic decision feedback signals and sampled against decision reference levels to make tentative symbol pre-decisions. The decision feedback loop is then used to select among the tentative pre-decisions after the prior symbol is resolved.

The use of pre-decisions to delay the need for a final decision on a prior symbol reduces the latency of the decision-feedback loop and helps timing closure of the timing critical path. Unfortunately, this advantage requires increasing the requisite number of samples for each symbol, and thus the required circuit area and power. Binary signaling requires two tentative decisions for each prior symbol under consideration, one for each of the two possible values of the prior symbol. PAM-4 signaling doubles the number of possible feedback signal combinations relative to common binary schemes, which results in significantly higher power usage and circuit area. PAM-4 also increases the number of pre-decisions that require consideration, which makes timing closure more difficult.

BRIEF DESCRIPTION OF THE DRAWINGS

The detailed description is illustrated by way of example, and not by way of limitation, in the figures of the accompanying drawings and in which like reference numerals refer to similar elements and in which:

FIG. 4 depicts a tentative-decision look-up table (LUT) 400 relating voltage regions $R_{12}:R_0$ for a current symbol value $d_n(k)$ to tentative symbol values given a preceding symbol value $d_{n-1}(k)$.

FIG. 7 depicts a tentative-decision LUT 700 similar to LUT of FIG. 4 but including a mapping of partial region decisions $r_0$, $r_1$, $r_2$, and $r_3$ to voltage regions $R_{12}:R_0$ and tentative-decision sets $TD_{12}:TD_0$.

DETAILED DESCRIPTION

Figure 1:
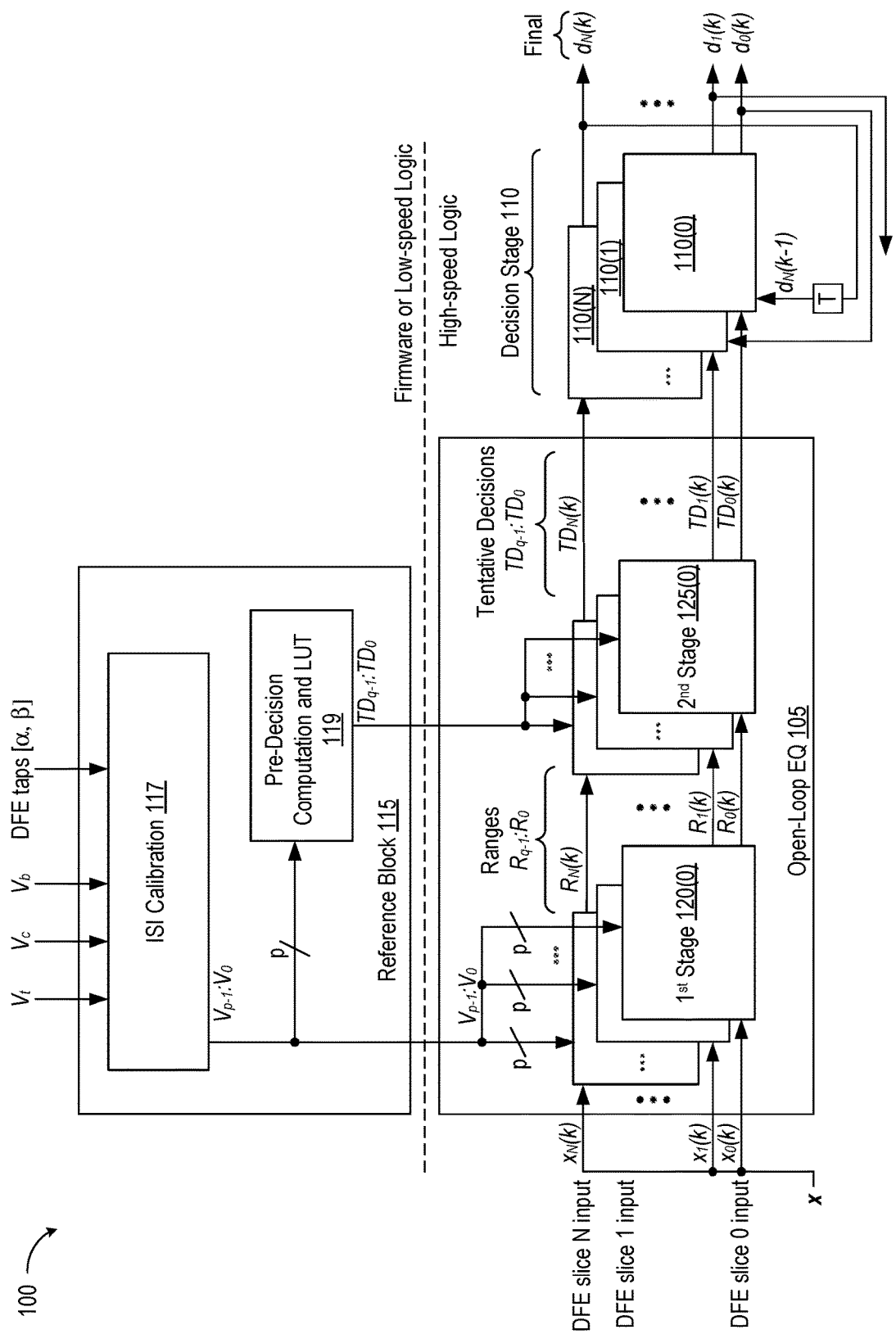
FIG. 1 depicts a PAM-4 DFE 100 that receives an input signal x (lower left) distorted by inter-symbol interference (ISI) and expressing a series of symbols each representing one of four pulse amplitudes (voltages) to convey two binary bits of data per symbol.

FIG. 1 depicts a PAM-4 DFE 100 that receives an input signal x (lower left) distorted by inter-symbol interference (ISI) and expressing a series of symbols each representing one of four pulse amplitudes (voltages) to convey two binary bits of data per symbol. DFE 100 includes N+1 DFE slices—collectively a "lane"—each operating at a data rate of 1/(N+1) times that of input signal x with a timing offset of one symbol time of input signal x relative to the neighboring DFE slice. The N+1 DFE slices thus process input signal x in parallel to relax timing constraints on DFE 100. In general, input signal $x_n(k)$ represents the sample of the nth DFE slice for n=0:N at discrete time k, and output signal $d_n(k)$ represent the final decision for the sample value of the nth DFE slice for n=0:N at discrete time k. DFE slice 0, for example, samples a symbol of input signal $x_0(k)$ with respect to a gamut of p reference-voltage levels V[p−1:0] to place the symbol within a voltage region R, makes a set of tentative decisions TD indicating the possible symbol values represented by the voltage region R, and considers the value of a prior symbol $d_N(k-1)$ from DFE slice N to narrow the tentative decisions down to a final decision $d_0(k)$. The number of DFE slices is thirty-two (N=31) in one embodiment.

DFE 100 includes an open-loop (feed-forward) equalizer 105 and a closed-loop (feedback) decision stage 110, each of which is divided into N+1 slices. A reference block 115 includes ISI calibration circuitry 117 that develops p reference-voltage levels $V_{p-1}:V_0$ and pre-decision computation circuitry 119 that produces q sets of tentative pre-decisions $TD_{q-1}:TD_0$ based on the voltage levels. As detailed below, each set of tentative pre-decisions identifies fewer than four tentative values of a sampled symbol given its measured voltage region. Decision stage 110 thus selects from among fewer than the four potential values of a PAM-4 system for each incoming symbol. To save power and area, the reference signals from block 115 are shared by all N DFE slices in this embodiment.

Open-loop equalizer 105 includes a first open-loop stage 120 and a second open-loop stage 125, each of which is divided into N+1 slices in service of like-referenced ones of DFE slices 0 to N. Considering DFE slice 0, first open-loop stage 120(0) samples each symbol in series symbols $x_0(k)$ relative to all or a subset of reference-voltage levels $V_{p-1}:V_0$ to locate the voltage level for the symbol within one of a set of q voltage regions $R_{q-1}:R_0$. Second open-loop stage 125(0) selects one of pre-decision sets $TD_{q-1}:TD_0$ using the identified voltage region.

Tentative-decision sets $TD_{q-1}:TD_0$, also referred to as "pre-decision sets," represent the symbol value or values that are possible for a given voltage region, with each set excluding at least one of the four PAM-4 values. Each tentative-decision set also relates the possible value or values to the value expressed by the preceding symbol. Decision stage 110(0) selects a final decision $d_0(k)$ from among the tentative subset of possible values based on the resolved value of prior decision $d_N(k-1)$ from the DFE slice N charged with resolving the value of the preceding symbol in overall input signal x. Second open-loop stage 125(0) simplifies the process of making the final decision by reducing the number of possibilities to a tentative subset and thus eases the timing closure of the closed-loop decision feedback loop of decision stage 110(0).

Figure 2:
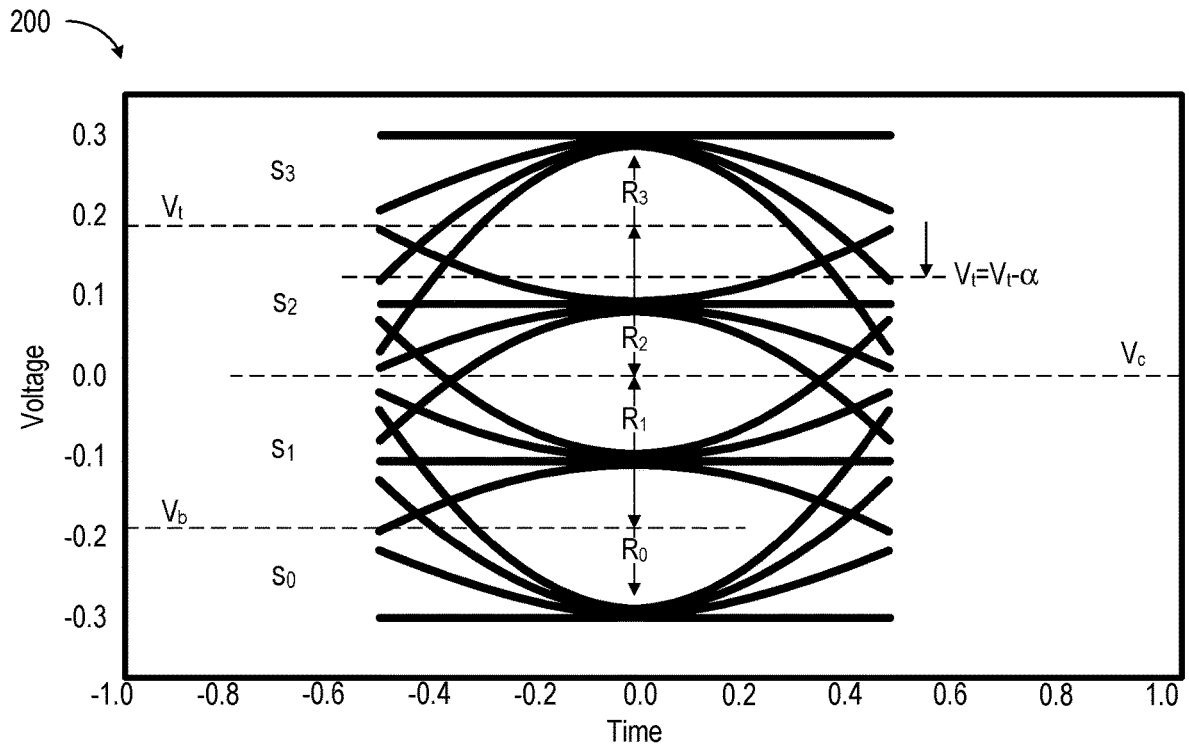
FIG. 2 includes an eye diagram 200 and table 205 illustrating how ISI calibration circuitry 117 of FIG. 1 calculates ISI-adjusted reference levels $V_{p-1}:V_0$.

FIG. 2 includes an eye diagram 200 and table 205 illustrating how ISI calibration circuitry 117 of FIG. 1 calculates ISI-adjusted reference levels $V_{p-1}:V_0$. PAM-4 DFE 100 communicates four symbol values $s_3:s_0$. In particular, symbol value $s_0$ is the decision symbol for PAM-4 transmit level (−3); symbol value $s_1$ is the decision symbol for PAM-4 transmit level (−1); symbol $s_2$ is the decision symbol for PAM-4 transmit level (1); and symbol value $s_3$ is the decision symbol for PAM-4 transmit level (3). These four PAM-4 signal levels are distinguished using three nominal reference-voltage levels. Reference voltage level $V_b$ (bottom level) represents the decision boundary between symbol values so and Si; voltage level $V_b$ (center level) the decision boundary between symbol values $s_1$ and $s_2$; and voltage level $V_t$ (top level) the decision boundary between symbol values $s_2$ and $s_3$.

Nominal reference levels $V_b$, $V_c$, and $V_t$ are adjusted using DFE taps to generate $3 \times 2^{2L}$ ISI-adjusted reference levels, where L is the number of DFE taps. DFE 100 of FIG. 1 has one tap, calling for the three sets of four (twelve) reference-voltage levels provided in the following equations 1-3.

$$\hat{V}_{t,m(0),\ldots,m(L-1)} = V_t + \sum_{l=0}^{L-1} c_l[m(l)] \quad (1)$$

$$\hat{V}_{c,m(0),\ldots,m(L-1)} = V_c + \sum_{l=0}^{L-1} c_l[m(l)] \quad (2)$$

$$\hat{V}_{b,m(0),\ldots,m(L-1)} = V_b + \sum_{l=0}^{L-1} c_l[m(l)] \quad (3)$$

Vector $c_l=[-\alpha_l, -\beta_l, \beta_l, \alpha_l]$, for l=0:L−1 represents the DFE taps for the cancellation of ISI from the lth post-cursors, and $m(l) \in \{0, 1, 2, 3\}$ is an index for selecting the m(l)th entry in vector $c_l$; $\alpha_l$ is the DFE tap to be added to the received signal (or subtracted from the reference level) for ISI compensation when the lth post-cursor decision is $s_3$, for l=0:L−1; and $\beta_l$ is the DFE tap to be added to the received signal for ISI compensation when the lth post-cursor decision is $s_2$, for l=0:L−1.

The ISI-adjusted reference levels are either static or quasi-static because the DFE taps and reference levels are either fixed after initial calibration or adapted periodically in operation. The computation of the ISI-adjusted reference levels can be implemented either as firmware or low-speed logic for reduced power. The ISI-adjusted reference levels are shared by the parallel DFE slices in a lane.

Given a preceding symbol decision so, top reference level Vt is adjusted by subtracting the corresponding DFE tap $\alpha_0$. The ISI-adjusted reference level Vt-$\alpha_0$ replaces $V_t$ as the decision boundary between symbols $s_2$ and $s_3$. Offsets for top reference-voltage level Vt are similarly calculated for the three remaining potential symbol decisions, as are the four offsets for each of center and bottom reference-voltage levels $V_c$ and $V_b$. Without loss of generality, table 205 lists the ISI-adjusted reference levels for a one-tap PAM-4 DFE that cancels ISI from the first post-cursor symbol, previous decision $d_{n-1}(k)$. Calculating tap values is well known to those of skill in the art so a detailed treatment is omitted.

Figure 3:
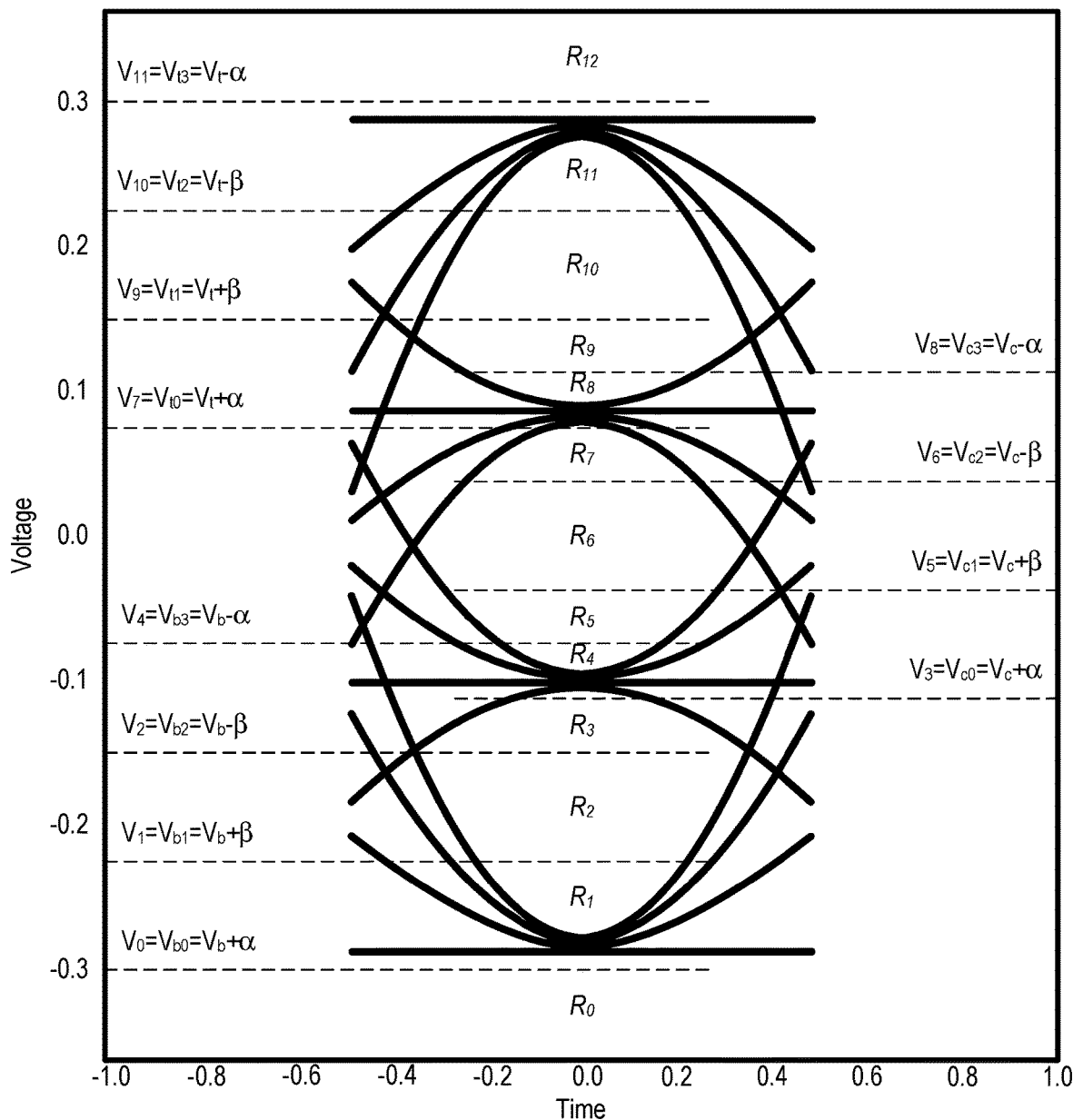
FIG. 3 depicts an eye diagram 300 in which ISI-adjusted reference-voltage levels $V_{p-1}:V_0$ of table 205 of FIG. 2 partition the entire range of received signal levels thirteen decision regions $R_{12}:R_0$.

FIG. 3 depicts an eye diagram 300 in which ISI-adjusted reference-voltage levels $V_{p-1}:V_0$ of table 205 of FIG. 2 partition the entire range of received signal levels into thirteen ISI-compensated decision regions $R_{12}:R_0$. There are twelve reference-voltage levels and thirteen decision regions in this example but more of fewer can be used for PAM-4 or other modulation schemes. In one embodiment selecting a value of p between eight and the lessor of sixteen or $3 \times 2^{2L}$, where L is the number of DFE taps, tends to optimize for power and area.

The highest and lowest regions $R_{12}$ and $R_0$ are dispositive as to the symbol value they represent. Region $R_{12}$ is above all reference-voltage levels $V_{11}:V_0$ and thus represents the highest value $s_3$. Region $R_0$ is below all reference-voltage levels $V_{11}:V_0$ and thus represents the lowest value $s_0$. The remaining regions are not dispositive but do exclude at least one of the four possible symbol values. Voltage region $R_8$, for example, is above all possible variants of bottom reference voltage $V_b$ (i.e. $V_1$ to $V_4$) and thus cannot represent the lowest symbol value $s_0$ but can represent any of the remaining symbol values $s_1$, $s_2$, and $s_3$. Pre-decision computation block 119 uses the ISI-adjusted voltages $V_0$ to $V_{11}$ in this way to populate a look-up table (LUT) relating each voltage region from $R_0$ to $R_{12}$ to a corresponding set of possible symbol values and makes these sets available to open-loop stage 125. Second open-loop stage 125 "looks up" the possible values for each region identified by first open-loop stage 120 to reduce the four possible PAM-4 symbol values to a tentative subset, and thus reduces the computational complexity of selecting a final value for each symbol. For example, second open-loop stage 125(0) can use voltage region $R_8$ from first open-loop stage 120(0) to select tentative-decision set $TD_8$ for passing to decision stage 110(0), and thus allow stage 110(0) to select final decision $d_0(k)$ from among symbol values $s_1$, $s_2$, and $s_3$.

FIG. 4 depicts a tentative-decision look-up table (LUT) 400 relating voltage regions $R_{12}:R_0$ for a current symbol value $d_n(k)$ to tentative symbol values given a preceding symbol value $d_{n-1}(k)$. For each identified voltage region R second open-loop stage 125(0) passes decision stage 110(0) a corresponding tentative decision set TD that identifies a set of tentative decisions in relation to the prior symbol value. Returning to the example of voltage region $R_8$, LUT 400 indicates that this level corresponds to tentative-decision set $TD_8$, which represents a current value $s_1$ if the preceding symbol was $s_3$, a current value $s_2$ if the preceding values was $s_1$ or $s_2$, and a current value $s_3$ if the preceding value was also $s_0$. Each set of tentative pre-decisions TD reduces the number of possible symbol values, which eases the timing closure of decision stage 110. LUT 400 can be static or quasi-static and can be implemented using either firmware or low-speed logic. LUT 400 can be shared by all parallel DFE slices in a lane to save area and power.

Figure 5:
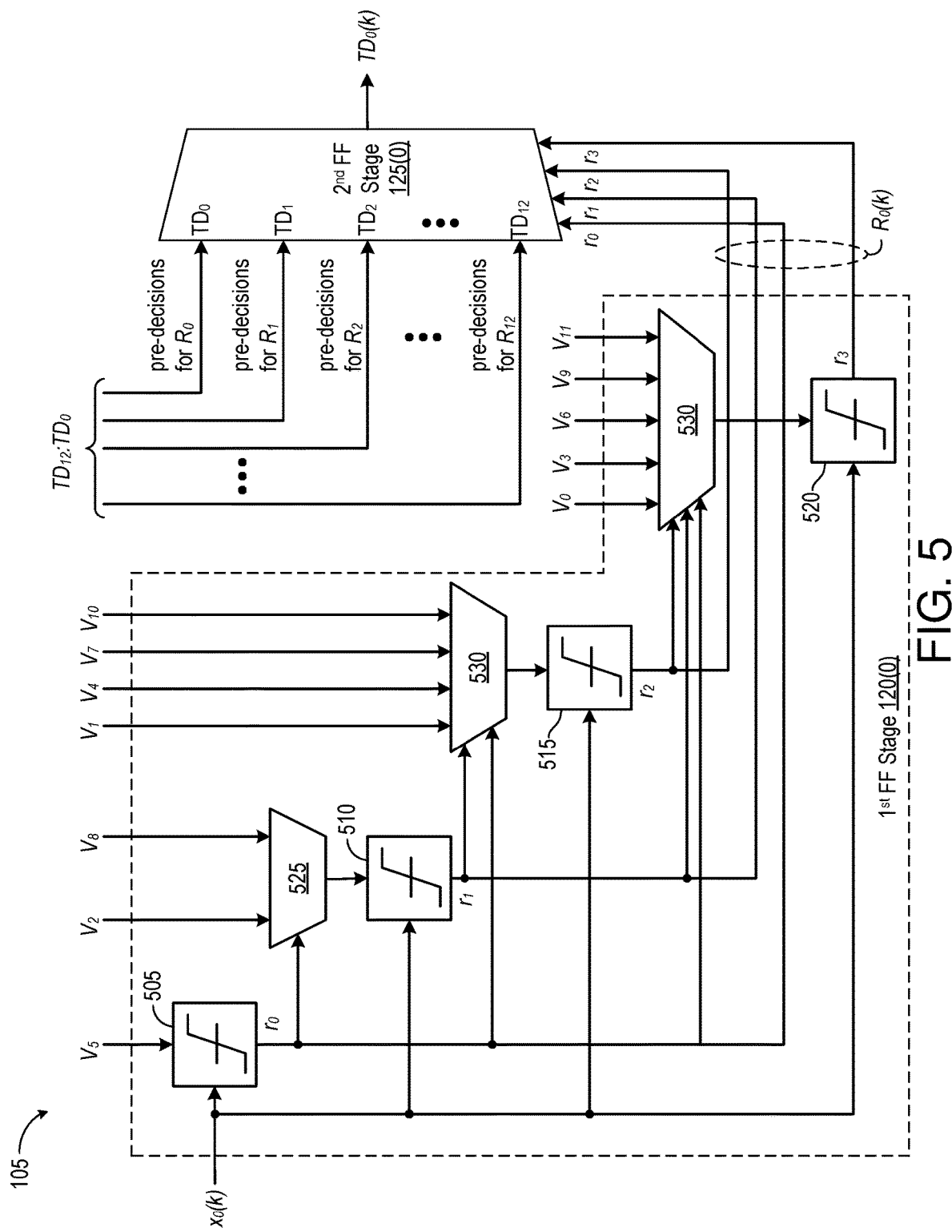
FIG. 5 details one slice 500 of open-loop equalizer 105 of FIG. 1, including first open-loop stage 120(0) and second open-loop stage 125(0).

FIG. 5 details one slice 500 of open-loop equalizer 105 of FIG. 1, including first open-loop stage 120(0) and second open-loop stage 125(0). The remaining slices are the same or similar.

First open-loop stage 120(0) includes four comparators 505, 510, 515, and 520 that issue respective partial region decisions $r_0$, $r_1$, $r_2$, and $r_3$ responsive to a subset of the gamut of reference-voltage levels $V_{11}:V_0$. Second open-loop stage 125(0) decodes each combination of partial region decisions $r_3:r_0$ to select among tentative decision sets $TD_{12}:TD_0$ for a given one of regions $R_{12}:R_0$, the sets noted for example in LUT 400 of FIG. 4.

From left to right, comparator 505 compares the level of present symbol $x_0(k)$ with the middle reference-voltage level $V_5$, issuing logic one (zero) value for partial region decision $r_0$ if the level of the present symbol is above (below) level $V_5$. Partial region decision $r_0$ is fed to second stage 125(0) and to a multiplexer 525 that compares present symbol $x_0(k)$ with either reference-voltage level $V_2$ or $V_8$ depending upon the value of partial region decision $r_0$ to issue a second partial region decision $r_1$. Two more multiplexers 530 and 535 continue this binary search against the remaining reference-voltage levels until the set of partial region decision $r_3:r_0$ indicate one of regions $R_{12}:R_0$. Second stage 125(0) then produces the corresponding set of tentative decisions from among sets $TD_{12}:TD_0$. ISI is thus indirectly compensated for by locating each symbol's amplitude within an ISI-compensated region.

Figure 6:
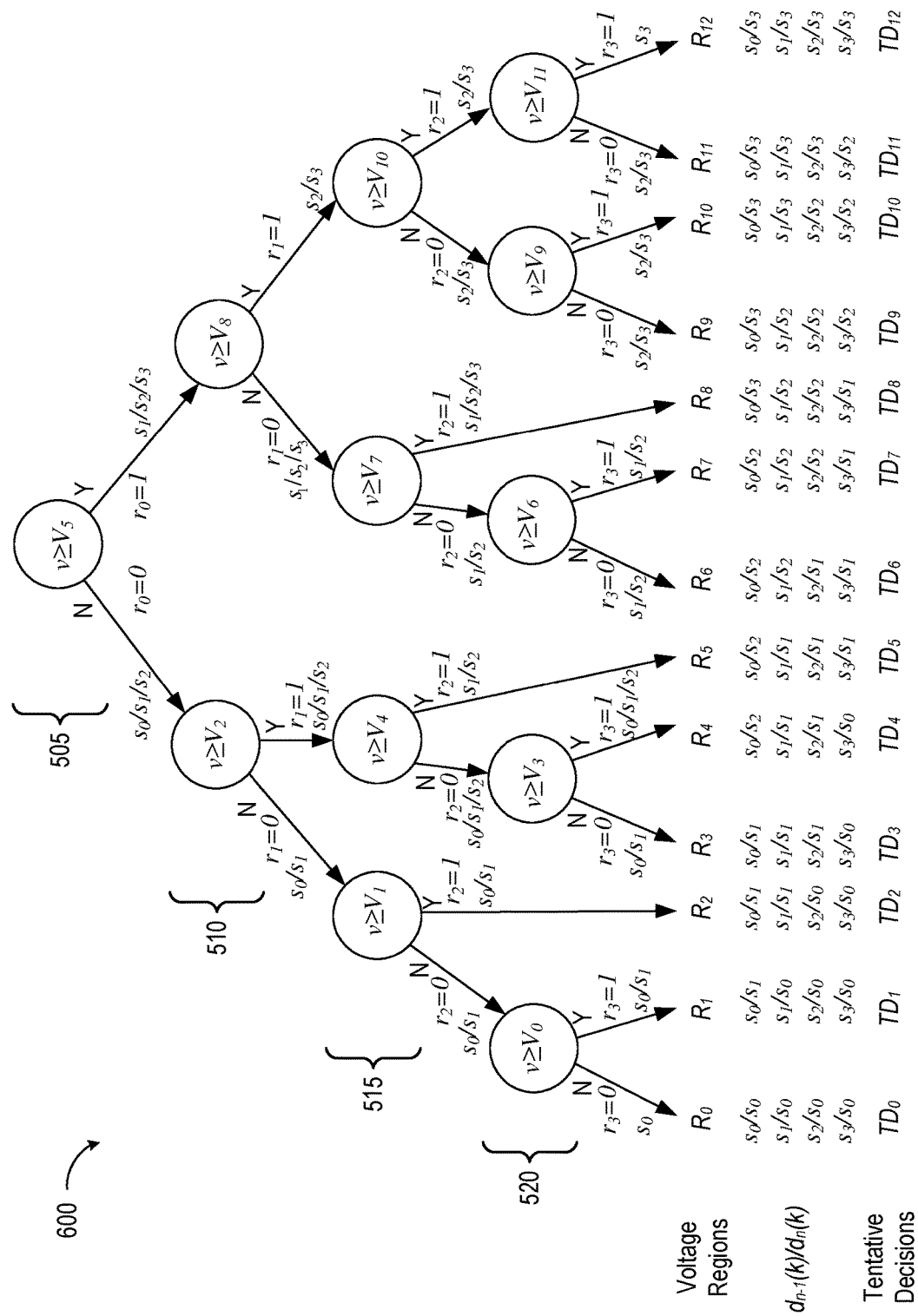
FIG. 6 is a decision tree 600 illustrating the binary search performed by first open-loop stage 120(0) to identify voltage regions $R_{12}:R_0$ and the sets of tentative decisions $TD_{12}:TD_0$ associated with each region shown in FIG. 3.

FIG. 6 is a decision tree 600 illustrating the binary search performed by first open-loop stage 120(0) to identify voltage regions $R_{12}:R_0$ and the sets of tentative decisions $TD_{12}:TD_0$ associated with each region. Each region is shown with four pre-symbol possibilities, one for each symbol type, and the corresponding tentative decisions. As noted previously, for example, region $R_8$ represents a current value s1 if the preceding symbol was s3, a current value s2 if the preceding value was s1 or s2, and a current value s3 if the preceding value was s0. Temporary decision $TD_8$ passes a value indicative of these relationships to allow decision stage 110 to simply select the final decision $d_n(k)$ based on the final decision dn-1(k) for the preceding symbol.

FIG. 7 depicts a tentative-decision LUT 700 similar to LUT of FIG. 4 but including a mapping of partial region decisions $r_0$, $r_1$, $r_2$, and $r_3$ to voltage regions $R_{12}:R_0$ and tentative-decision sets $TD_{12}:TD_0$.

Figure 8A:
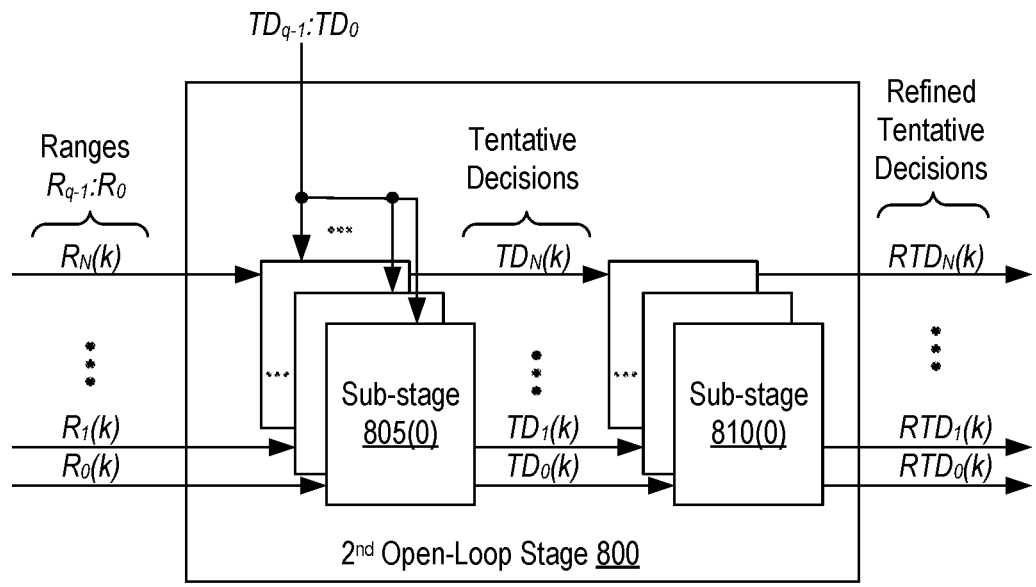
FIG. 8A depicts a second open-loop stage 800 in accordance with another embodiment.

FIG. 8A depicts a second open-loop stage 800 that can be used in place of open-loop stage 125 of FIG. 1 to produce further refined sets of tentative pre-decisions $RTD_{q-1}:RTD_0$. Second open-loop stage 800 includes a first open-loop sub-stage 805 and a second open-loop substage 810, each of which is divided into N+1 slices in service of like-references ones of DFE slices 0 to N in the manner detailed in connection with FIG. 1.

Sub-stage 805 produces the same sets of tentative pre-decisions $TD_{q-1}:TD_0$ detailed previously, each set representing the symbol value or values that are possible for a given voltage region. Sub-stage 810 then considers the tentative pre-decisions from neighboring slices, and thus the values of prior symbols, to further reduce the size of one or more sets of tentative pre-decisions $TD_{q-1}:TD_0$, and thus produce refined sets of tentative pre-decisions $RTD_{q-1}:RTD_0$. Reducing the number of potential symbol values further eases timing closure for decision feedback of e.g. stage 110.

Figure 8B:
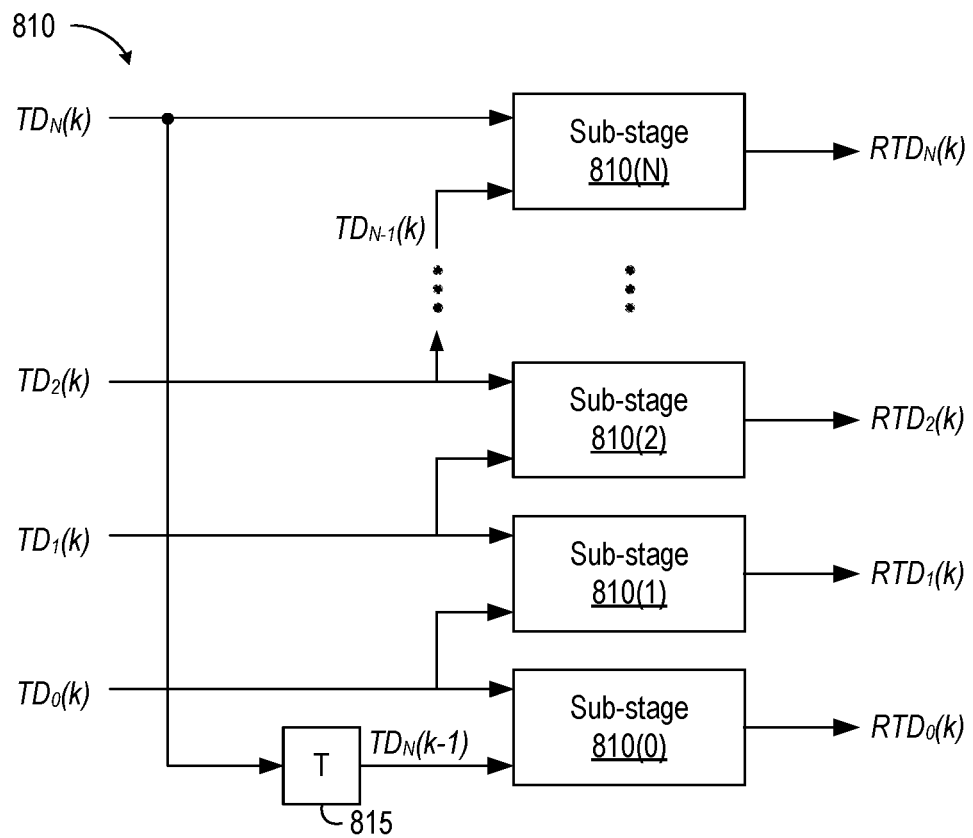
FIG. 8B illustrates how sub-stage 810 of FIG. 8A shares sets of tentative pre-decisions $TD_{q-1}:TD_0$ from sub-stage 805 to produce refined sets of tentative pre-decisions $RTD_{q-1}:RTD_0$.

FIG. 8B illustrates how slices of sub-stage 810 of FIG. 8A share sets of tentative pre-decisions $TD_{q-1}:TD_0$ to produce refined sets of tentative pre-decisions $RTD_{q-1}:RTD_0$. A delay element 815 delays pre-decision $TD_N(k)$ by one parallel clock cycle to apply delayed pre-decision $TD_N(k-1)$ to sub-stage 810(0). Each slice of sub-stage 810 receives sets of tentative pre-decisions from an adjacent slice that represent potential values of prior symbol $d_{n-1}(k)$, and that can be used to further reduce the number of tentative symbol values. With reference to FIG. 7, for example, a slice of sub-stage 810 receiving tentative pre-decisions $TD_4$ for the present symbol and prior tentative pre-decisions $TD_1$ from an adjacent slice can pass on a refined set of tentative decisions indicating that the current symbol is either $s_1$ or $s_2$. The value $s_0$ otherwise associated with tentative decision $TD_4$ is eliminated from consideration because the prior symbol, while not determined, is known not to have a value of $s_3$.

Another embodiment splits the amplitude range illustrated in FIG. 3 into e.g. four zones, one for each of respective symbol values $s_3:s_0$ for processing in parallel by four instances of the two open-loop stages. Each first open-loop stage considers a reduced number of sub-regions and each second stage requires a smaller LUT. This embodiment may reduce the latency of the forward data path, particularly for large numbers of DFE taps and sub-regions.

While the subject matter has been described in connection with specific embodiments, other embodiments are also envisioned. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:
1. A decision-feedback equalizer (DFE) comprising:
   an input node to receive an input signal expressing a series of symbols, each of the symbols representing one of a set of possible symbol values;
   a first open-loop stage coupled to the input node to receive the series of symbols and a gamut of reference-voltage levels, the first open-loop stage to compare each sym- bol in the series of symbols with only a subset of the reference-voltage levels to identify a voltage region;

a second open-loop stage coupled to the first open-loop stage to derive from the voltage region a set of tentative decisions representing a subset of the set of possible symbol values; and a feedback stage coupled to the second open-loop stage to select one of the set of tentative decisions as a final decision responsive to a prior final decision.

2. The DFE of claim 1, wherein the second open-loop stage, for each of the symbols:
compares the symbol to a first of the reference-voltage levels to make a first partial decision;
selects a second of the reference-voltage levels responsive to the first partial decision; and
compares the symbol to the second of the reference-voltage levels to make a second partial decision.

3. The DFE of claim 2, wherein the second open-loop stage, for each of the symbols:
compares the symbol to a third of the reference-voltage levels to make a third partial decision;
selects a fourth of the reference-voltage levels responsive to the third partial decision; and
compares the symbol to the fourth of the reference-voltage levels to make a fourth partial decision.

4. The DFE of claim 3, wherein the first, second, third, and fourth partial decisions indicate the voltage region.

5. The DFE of claim 4, wherein the second open-loop stage decodes the first, second, third, and fourth partial decisions to derive the set of tentative decisions.

6. The DFE of claim 1, wherein the first open-loop stage compares each of the symbols to the subset of the reference-voltage levels in order.

7. The DFE of claim 1, wherein the subset of the reference-volage levels is of a number equal to the number of the possible symbol values.

8. The DFE of claim 1, wherein the subset of the reference-voltage levels is of a number one third of the number of the reference-voltage levels.

9. The DFE of claim 1, further comprising a reference-level generator to generate the reference-voltage levels.

10. The DFE of claim 1, further comprising a look-up table, coupled to the second open-loop stage, to store a mapping between the voltage regions and subsets of the set of symbol values.

11. A method of interpreting an input signal expressing a series of symbols, each of the symbols representing one of a set of possible symbol values, the method comprising:
providing p reference-voltage levels; and
for each of the series of symbols:
comparing the symbol with a first of the reference-voltage levels to produce a first partial decision;
selecting a second of the reference-voltage levels responsive to the first partial decision;
comparing the symbol with the second of the reference-voltage levels to produce a second partial decision;
providing a set of tentative decision as to the value of the symbol based on the first and second partial decisions, wherein the set of tentative decisions includes more than one tentative decision for some of the symbols in the series of symbols; and
selecting one of the at least one tentative decisions as a final decision.

12. The method of claim 11, the method selecting the one of the tentative decisions for each of the symbols as a final decision responsive to a prior final decision.

13. The method of claim 11, further comprising, for each of the series of symbols:
comparing the symbol with a third of the reference-voltage levels to produce a third partial decision;
selecting a fourth of the reference-voltage levels responsive to the third partial decision; and
comparing the symbol with the third of the reference-voltage levels to produce a fourth partial decision.

14. The method of claim 13, wherein each of the sets of tentative decisions includes less than four tentative decisions.

15. The method of claim 11, further comprising calibrating the reference-voltage levels.

16. A decision-feedback equalizer (DFE) comprising:
an input node to receive an input signal expressing a series of symbols, each of the symbols representing one of a set of possible symbol values;
a reference-level generator to provide a gamut of reference-voltage levels; and
an open-loop stage coupled to the input node to receive the series of symbols, the open-loop stage to compare each symbol in the series of symbols to a first of the gamut of reference-voltage levels to make a first partial decision as to the value of the symbol, select a second of the gamut of reference-voltage levels responsive to the first partial decision, and compare the symbol to the second of the gamut of reference-voltage levels to make a second partial decision as to the value of the symbol.

17. The DFE of claim 16, further comprising a closed-loop stage to make a final decision as to the value of each symbol responsive to the first partial decision as to the value of the symbol and, the second partial decision as to the value of the symbol.

18. The DFE of claim 17, the closed-loop stage further to make the final decision as to the value of each symbol responsive to the final decision as to the value of a preceding one of the symbols.

19. The DFE of claim 16, wherein the open-loop stage is of a first DFE slice, the DFE further comprising additional DFE slices each coupled to the input node to receive the series of symbols and sample the received series of symbols at respective sample timings.

20. The DFE of claim 19, wherein each of the DFE slices provides a final decision to another of the DFE slices.

* * * * *